(12) United States Patent
Kwon

(10) Patent No.: US 10,057,463 B2
(45) Date of Patent: Aug. 21, 2018

(54) MOBILE TERMINAL AND CONTROL METHOD THEREFOR

(71) Applicant: LG ELECTRONICS INC., Seoul (KR)

(72) Inventor: Yoongeun Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 15/305,434

(22) PCT Filed: Jan. 21, 2015

(86) PCT No.: PCT/KR2015/000642
§ 371 (c)(1),
(2) Date: Oct. 20, 2016

(87) PCT Pub. No.: WO2015/174611
PCT Pub. Date: Nov. 19, 2015

(65) Prior Publication Data
US 2017/0048427 A1    Feb. 16, 2017

(30) Foreign Application Priority Data
May 16, 2014  (KR) .......................... 10-2014-0059164

(51) Int. Cl.
*H04N 5/225*      (2006.01)
*H04M 1/725*     (2006.01)
(Continued)

(52) U.S. Cl.
CPC ............. *H04N 5/225* (2013.01); *G06F 3/012* (2013.01); *H04M 1/725* (2013.01);
(Continued)

(58) Field of Classification Search
None
See application file for complete search history.

(56) References Cited

U.S. PATENT DOCUMENTS 5,610,678 A * 3/1997 Tsuboi ................. G02B 27/017
348/341
2002/0048459 A1  4/2002 Mishio
(Continued)

FOREIGN PATENT DOCUMENTS

JP          02121009 A  *  5/1990
JP        2010-231227 A    10/2010
(Continued)

*Primary Examiner* — Roberto Velez
*Assistant Examiner* — Quan Pham
(74) *Attorney, Agent, or Firm* — Birch, Stewart, Kolasch & Birch, LLP

(57) ABSTRACT

Disclosed are a mobile terminal having an image capturing function, and a method of controlling the same. The mobile terminal includes a body; a sensing unit configured to sense a motion of the body; a camera formed to be relatively-rotatable with respect to the body, based on the sensed motion; a display unit configured to output an image input through the camera; and a controller configured to relatively-rotate the camera with respect to the body in a moving direction of the body when a motion of the body is sensed, such that an image of a place corresponding to a predicted moving path of the body based on the motion of the body is output, wherein an image input through the relatively-rotated camera is output to the display unit.

10 Claims, 18 Drawing Sheets

(51) Int. Cl.
*H04N 5/232* (2006.01)
*G06F 3/03* (2006.01)
*G06F 3/01* (2006.01)
*G06F 3/0346* (2013.01)

(52) U.S. Cl.
CPC ...... H04M 1/72522 (2013.01); H04N 5/2259 (2013.01); H04N 5/23216 (2013.01); H04N 5/23293 (2013.01); *G06F 3/0346* (2013.01); *H04M 2250/12* (2013.01); *H04M 2250/20* (2013.01); *H04M 2250/52* (2013.01)

(56) References Cited

U.S. PATENT DOCUMENTS

| | | | |
|---|---|---|---|
| 2004/0155968 A1* | 8/2004 | Cheatle | H04N 7/18 348/207.99 |
| 2009/0096858 A1 | 4/2009 | Jeong | |
| 2009/0153685 A1 | 6/2009 | Son et al. | |
| 2012/0293702 A1* | 11/2012 | Siulinski | G02B 27/017 348/333.09 |
| 2013/0241818 A1 | 9/2013 | Ohta | |

FOREIGN PATENT DOCUMENTS

| | | |
|---|---|---|
| KR | 10-2009-0036734 A | 4/2009 |
| KR | 10-2009-0065914 A | 6/2009 |
| KR | 10-2011-0129999 A | 12/2011 |

* cited by examiner

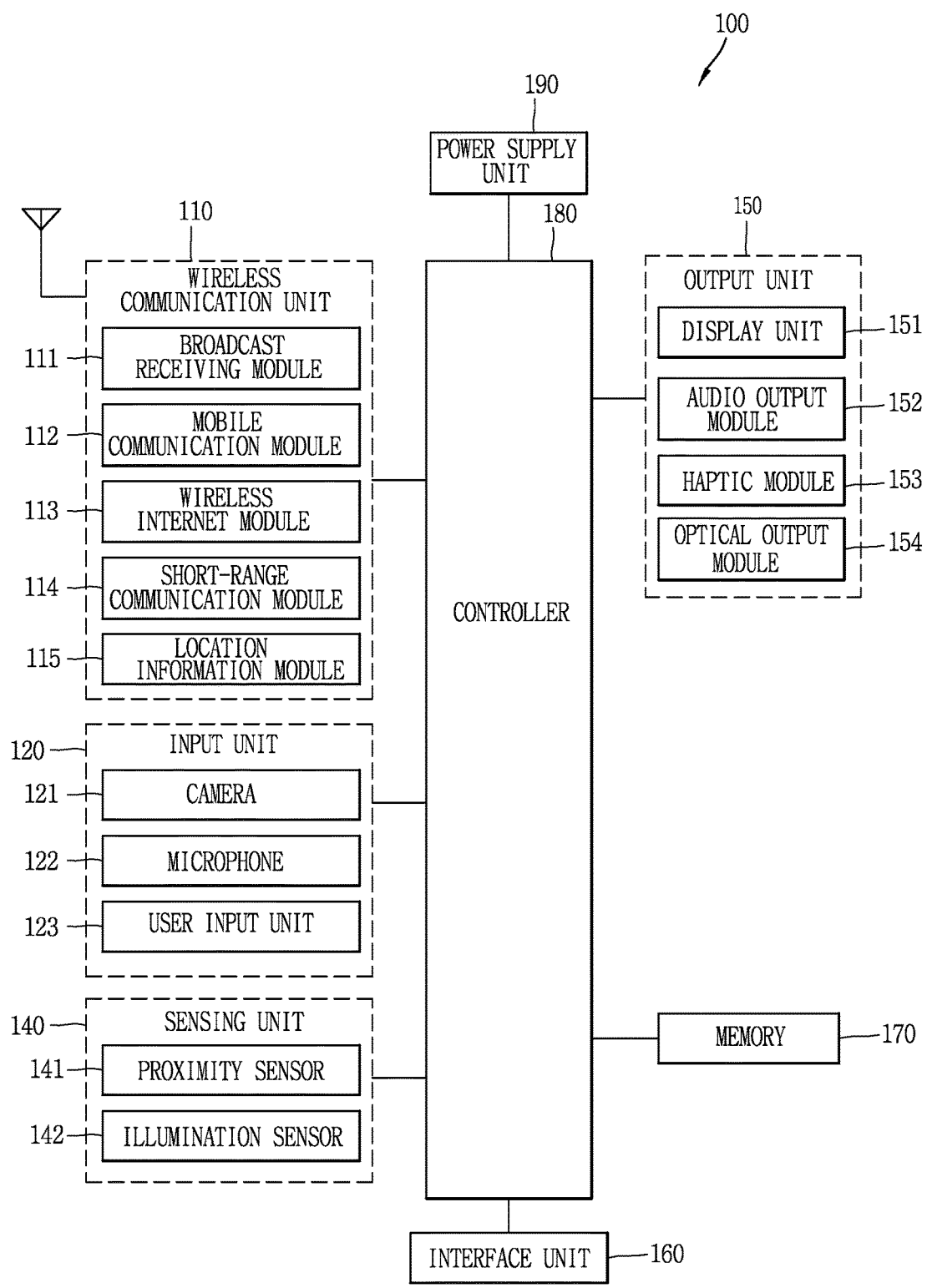

MOBILE TERMINAL AND CONTROL METHOD THEREFOR

CROSS REFERENCE TO RELATED APPLICATIONS

This application is the National Phase of PCT International Application No. PCT/KR2015/000642, filed on Jan. 21, 2015, which claims priority under 35 U.S.C. 119(a) to Patent Application No. 10-2014-0059164, filed in Republic of Korea on May 16, 2014, all of which are hereby expressly incorporated by reference into the present application.

BACKGROUND OF THE INVENTION

1. Field of the Invention

The present invention relates to a mobile terminal having an image capturing function, and a method of controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Various attempts have been made to implement complicated functions in such a multimedia device by means of hardware or software. For instance, a user interface (UI) for allowing a user to search or select functions easily and conveniently is being provided.

Recently, as a camera provided at the mobile terminal has enhanced resolution and function, a utilization degree of the camera is increased.

SUMMARY OF THE INVENTION

Therefore, an aspect of the detailed description is to provide a mobile terminal capable of providing an optimized image when a user captures images with moving the mobile terminal, and a control method thereof.

Another aspect of the detailed description is to provide a mobile terminal capable of pre-displaying an image positioned at a direction toward which the mobile terminal is moving for image capturing, and capable of capturing the image, and a control method thereof.

To achieve these and other advantages and in accordance with the purpose of this specification, as embodied and broadly described herein, there is provided a mobile terminal, including: a body; a sensing unit configured to sense a motion of the body; a camera formed to be relatively-rotatable with respect to the body, based on the sensed motion; a display unit configured to output an image input through the camera; and a controller configured to relatively-rotate the camera with respect to the body in a moving direction of the body when a motion of the body is sensed, such that an image of a place corresponding to a predicted moving path of the body based on the motion of the body is output, wherein an image input through the relatively-rotated camera is output to the display unit.

In an embodiment, the camera may be operated in either a first state before relative-rotation with respect to the body, or a second state after relative-rotation with respect to the body. The controller may convert the camera to the second state from the first state when the motion of the body is sensed.

In an embodiment, when the motion of the body is stopped, the controller may relatively-rotate the camera with respect to the body in an opposite direction to the moving direction of the body.

In an embodiment, the controller may extract at least one attribute information related to the sensed motion of the body. When the extracted attribute information satisfies a preset condition, the controller may relatively-rotate the camera with respect to the body.

In an embodiment, the extracted attribute information may include at least one of a direction, a speed and an acceleration, and the controller may determine a relative-rotation degree of the camera with respect to the body, based on at least one of the speed and the acceleration.

In an embodiment, the display unit may include a first region and a second region, and the controller may determine a position of the first and second regions on the display unit, based on the moving direction of the body. Part of an image input through the camera before relative-rotation with respect to the body may be output to the first region, and part of an image input through the camera after relative-rotation with respect to the body may be output to the second region.

In an embodiment, the controller may control a size of the second region in proportion to a relative-rotation degree of the camera with respect to the body, and a size of the first region may be changed by depending on change of the size of the second region.

To achieve these and other advantages and in accordance with the purpose of this specification, as embodied and broadly described herein, there is also provided a method of controlling a mobile terminal, including: outputting an image input through a camera, to a display unit; sensing a motion of a body; when the motion of the body is sensed, relatively-rotating the camera with respect to the body in a moving direction of the body, such that an image of a place corresponding to a predicted moving path of the body based on the motion of the body is output; and outputting an image input through the relatively-rotated camera, to the display unit.

In an embodiment, the camera may be operated in either a first state before relative-rotation with respect to the body, or a second state after relative-rotation with respect to the body. In the step of outputting, if the motion of the body is sensed, the camera may be converted to the second state from the first state, and a second image input in the second state may be output to the display unit.

In an embodiment, in the step of relatively-rotating, if the moving body is stopped, the camera may be relatively-rotated with respect to the body in an opposite direction to the moving direction of the body.

In an embodiment, in the step of relatively-rotating, at least one attribute information related to the sensed motion of the body may be extracted, and if the extracted attribute information satisfies a preset condition, the camera may be relatively-rotated with respect to the body.

The present invention can have the following advantages.

Once a motion of the body is sensed, the camera is relatively-rotated with respect to the body in a moving direction of the body. As a result, an image of a place disposed in the moving direction can be output to the display unit in advance. This can allow a user to obtain an image of his or her preferred place more rapidly, even by a small motion of the body when rotating the body of the mobile terminal so as to capture the preferred place. Thus, a user's convenience can be enhanced.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1A is a block diagram illustrating a mobile terminal according to the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
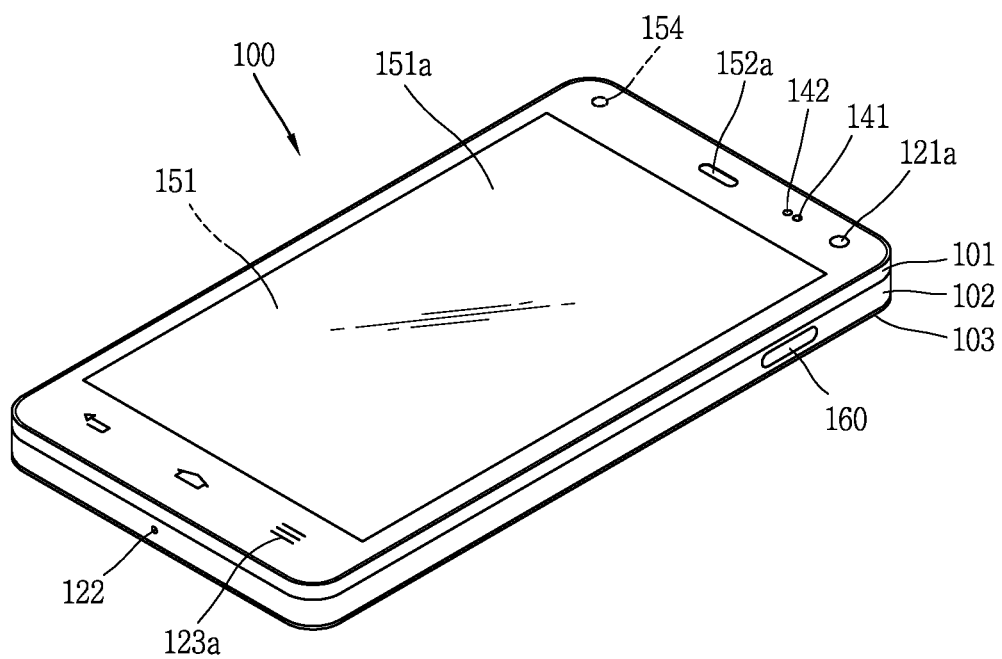
FIGS. 1B and 1C are conceptual views illustrating an example of a mobile terminal according to the present invention, which are viewed from different directions.
Figure 1C:
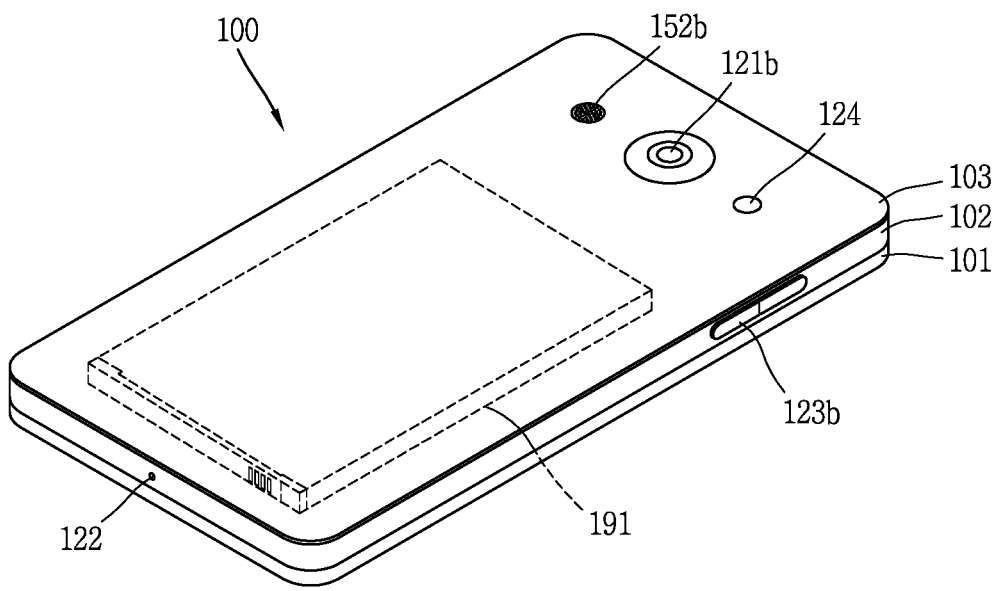

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the WI-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
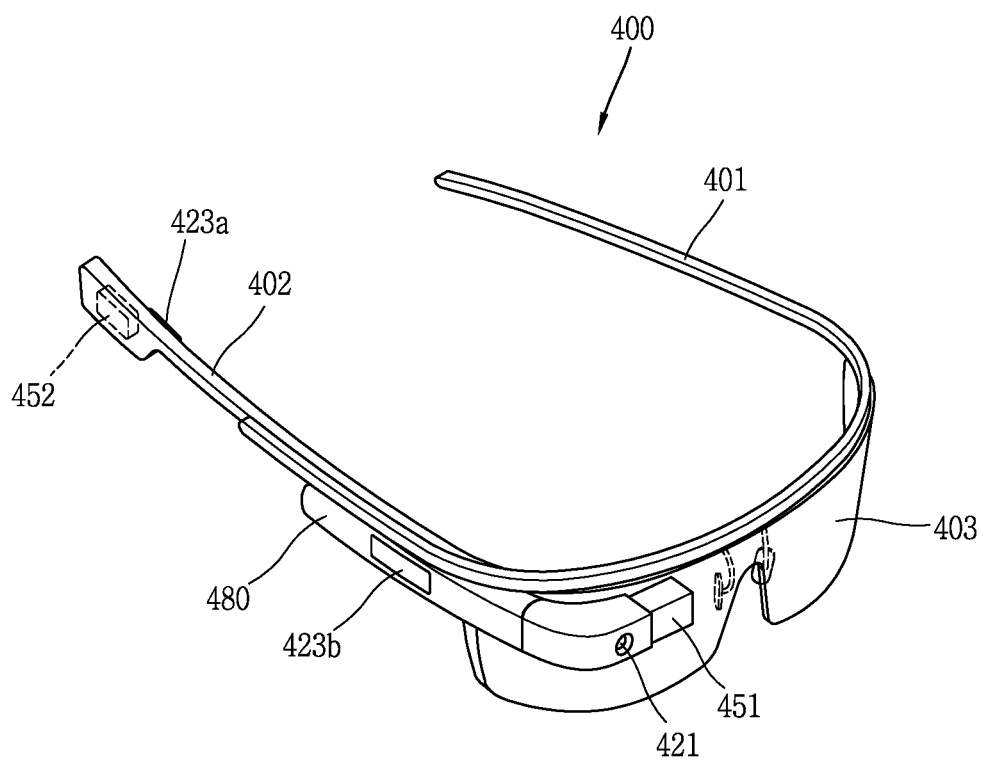
FIG. 2 is a perspective view illustrating an example of a glass-type mobile terminal according to another embodiment of the present invention.

FIG. 2 is a perspective view illustrating an example of a glass-type mobile terminal according to another embodiment of the present invention.

The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 2 illustrates that the control module 480 is installed in the frame part on one side of the head, but other locations are possible.

Figure 4:
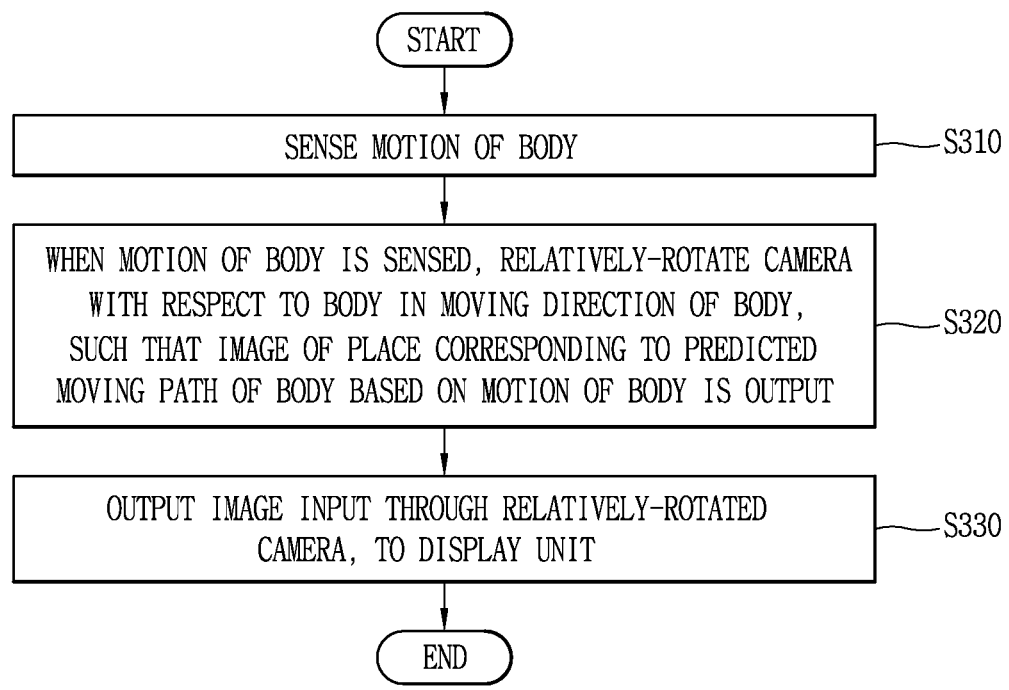
FIG. 4 is a flowchart illustrating a method of controlling a mobile terminal according to an embodiment of the present invention.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

Hereinafter, an embodiment of the present invention will be explained with taking the mobile terminal 100 rather than the glass-type mobile terminal 400, as a main example. The following embodiment of the mobile terminal 100 is also applicable to the glass-type mobile terminal 400 in the same or similar manner.

The mobile terminal according to the present invention, which can include at least one of the aforementioned components, may provide an image capturing function for storing images received through a camera in a memory. An operation of the mobile terminal to store images received through a camera in a memory may be expressed as 'photographing images', 'obtaining images', 'capturing images', etc. Any expressions may be used if they have a meaning that images received through a camera can be stored in a memory.

In the present invention, the mobile terminal may perform an image capturing operation based on a user's selection. The user's selection may be expressed as 'a user's control command' or 'a control command'. The user's selection may be performed in various manners. For instance, a user may select an image capturing function by touching or pressing a hardware key provided at the mobile terminal, or by touching a software key or a visual key output to the display unit 151. That is, if a hardware key related to an image capturing function is touched or pressed, or if a software key or a visual key output to the display unit 151 is touched, the controller 180 may determine that a user's control command for performing an image capturing function has been received. The controller 180 may capture an image input through the camera 121 based on such a control command. The image capturing function may be performed when a user's voice corresponding to a preset command is received through a microphone, when a specific gesture is applied to the mobile terminal, or when a preset motion is sensed from the mobile terminal.

Figure 3:
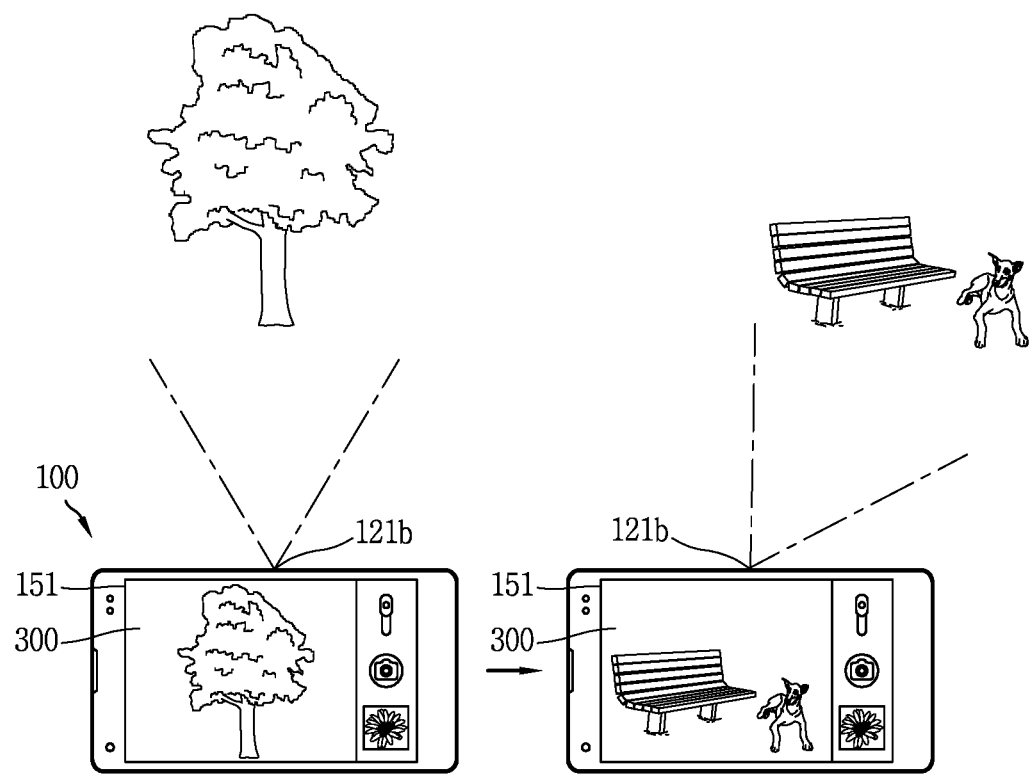
FIG. 3 is a conceptual view illustrating an embodiment of the present invention.

In the present invention, an image, disposed at a direction toward which the mobile terminal 100 is moving, may be pre-output to the display unit 151. Hereinafter, the mobile terminal capable of pre-outputting an image disposed at a direction toward which the body 100 is moving, and a control method thereof will be explained in more detail with reference to the attached drawings. FIG. 3 is a conceptual view illustrating an embodiment of the present invention. FIG. 4 is a flowchart illustrating a method of controlling a mobile terminal according to an embodiment of the present invention.

Firstly, an image capturing function is performed. Execution of the image capturing function may mean execution of an application that is driven for image capturing. If the image capturing function is executed, the controller 180 may activate the camera 121 so that images can be captured.

The image capturing function may be executed as an icon related to the image capturing function (or an icon of an application) is selected (or touched). If the image capturing function is executed as an icon is selected, the display unit 151 may be turned on. Alternatively, the image capturing function may be executed when at least one of keys provided at the mobile terminal (e.g., at least one of hardware keys and software keys) is selected. In this instance, the controller 180 can execute the image capturing function if the key provided at the mobile terminal is selected, even if the display unit 151 is in an 'off' state.

In a state where the image capturing function has been executed, if a user moves the mobile terminal (the body) 100, the controller 180 may sense a motion of the body 100 (S310).

The body 100 is the same as the terminal body aforementioned with reference to FIG. 1, which may indicate a hardware component at which the respective components of the mobile terminal 100 are provided. Hereinafter, the body has the same reference numeral '100' as the mobile terminal.

The motion of the body 100 may be implemented by a user's manipulation. For instance, the motion of the body 100 may be implemented by a user's moving the body 100 toward a subject to be captured. Alternatively, the motion of the body 100 may mean a movement in all directions. More specifically, the motion of the body 100 may mean a movement of the body 100 in a horizontal direction (left and right sides) with respect to a lengthwise direction of a front surface of the mobile terminal where the display unit 151 is provided, or in a vertical direction (upper and lower sides) with respect to the lengthwise direction of the front surface. If a motion of the body 100 is sensed in a direction corresponding to a reference line which penetrates the front surface vertically (front and rear directions), the controller 180 may restrict relative-rotation of the camera 121. The motion of the body 100 in a direction corresponding to a reference line which penetrates the front surface vertically may mean a movement of the body 100 in back and forth directions based on a user. If the body 100 is moved in a direction corresponding to a reference line which penetrates the front surface vertically (front and rear directions), the controller 180 may execute other function rather than relative-rotation of the camera 121. The other function may include at least one of a zoom-in function and a zoom-out function. For instance, the controller 180 may execute a zoom-in function when a motion of the body 100 in a forward direction is sensed. On the other hand, the controller 180 may execute a zoom-out function when a motion of the body 100 in a backward direction is sensed.

The motion of the body 100 may include a rotation of the body 100. More specifically, the rotation of the body 100 may mean a rotation of the body 100 based on a reference line parallel to a lengthwise direction of the front surface of the mobile terminal where the display unit 151 is provided, a reference line perpendicular to the lengthwise direction of the front surface, and a reference line corresponding to a diagonal direction of the front surface.

Hereinafter, the present invention will be explained according to an embodiment where the mobile terminal 100 is moved or rotated in all directions (left and right directions, upper and lower directions, and a diagonal direction), except for a direction corresponding to a reference line which penetrates the front surface vertically (front and rear directions).

Once a motion of the body 100 is sensed, the controller 180 may rotate the camera 121. The controller 180 may control the camera 121 to be relatively-rotated with respect to the body 100 in a moving direction of the body 100. More specifically, once a motion of the body 100 is sensed, the controller 180 may control the camera 121 to be relatively-rotated with respect to the body 100 in a moving direction of the body 100, such that an image of a place corresponding to a predicted moving path of the body based on the motion of the body is output (S320). A subject desired to be captured by a user may be disposed at the place. That is, a user may move the body 100 so as to capture a subject positioned at a place corresponding to a predicted moving path of the body 100. Thus, the controller 180 may pre-output an image of a place where the subject is positioned, i.e., a place corresponding to a predicted moving path of the body 100, to the display unit 151, by relatively-rotating the camera 121 with respect to the body 100 in a moving direction of the body 100.

As shown in FIG. 3, the controller 180 may activate the camera 121 once an image capturing function is executed. Then, if a motion of the body 100 is sensed, the controller 180 may output an image of a place corresponding to a predicted moving path of the body 100 based on the motion of the body, to the display unit 151. The image of a place corresponding to a predicted moving path of the body 100 based on the motion of the body may mean an image to be input by a camera fixed at a corresponding position, in a case where the body is positioned on a predicted moving path in a state where a direction that a front surface of the camera 121 faces is perpendicular to a front surface (or rear surface) of the body 100. That is, if the body 100 is moving along the predicted moving path in a state where a direction that a front surface of the camera 121 faces is perpendicular to a front surface (or rear surface) of the body 100, the controller 180 may pre-output information on a subject to be captured by the camera 121, to the display unit 151, before the motion of the body is completed. For this, the controller 180 may control the camera 121 to be relatively-rotated with respect to the body 100 in a moving direction of the body 100.

The relative-rotation of the camera 121 with respect to the body 100 may mean control of an angle between a front surface of the body and a reference line corresponding to a direction that a front surface of the camera faces. The relative-rotation of the camera according to the present invention will be explained in more detail in comparison with a general case. Generally, the camera 121 is provided so that a reference line corresponding to a direction that a front surface of the camera 121 faces is perpendicular to a front surface of the body 100. The camera 121 is moved or rotated together with the body 100 in a dependent manner on the body 100, in a state where a reference line corresponding to a direction that a front surface of the camera 121 faces is perpendicular to a front surface of the body 100. In this instance, an angle between the front surface of the body and the reference line corresponding to a direction that the front surface of the camera faces is always maintained as a right angle (90°) even if the camera 121 is rotated by depending on a rotation of the body 100, because the reference line corresponding to a direction that the front surface of the camera faces is perpendicular to the body 100.

On the other hand, the relative-rotation of the camera 121 with respect to the body 100 may mean that an angle between the front surface of the body and the reference line corresponding to a direction that the front surface of the camera faces has a value rather than a right angle (90°). That is, once a rotation of the body is sensed, the controller 180 may control the camera 121 to be rotated, more than in a case where the camera 121 is rotated while maintaining an angle between the front surface of the body and the reference line corresponding to a direction that the front surface of the camera faces as a right angle (90°), such that a rotation direction of the body is recognized. A hardware configuration of relative-rotation of the camera 121 with respect to the body 100 will be explained later with reference to FIG. 6.

The camera 121 may be operated in a first state where an angle between the front surface of the body and the reference line corresponding to a direction that the front surface of the camera faces is a right angle (90°), i.e., a state before it is relatively-rotated with respect to the body 100. The camera 121 may be also operated in a second state where it has been relatively-rotated with respect to the body 100. That is, the camera 121 may be operated either in the first state, or in the second state. The controller 180 may convert the camera 121 from the first state to the second state when a motion of the body is sensed.

If it is sensed that the body 100 is being moved, the controller 180 may relatively-rotate the camera 121 with respect to the body 100. On the other hand, if the body 100 stops moving, the controller 180 may control the camera 121 which has been relatively-rotated, to be restored to a state before the relative-rotation, or the controller 180 may control the camera 121 which has been relatively-rotated to maintain the relatively-rotated state. The restoration of the camera 121 to a state before the relative-rotation may mean relative-rotation of the camera with respect to the body in an opposite direction to a moving direction of the body.

The controller 180 may control relative-rotation of the camera 121 with respect to the body 100. More specifically, in a case where a motion of the body 100 has been sensed, if the motion satisfies a preset condition, the controller 180 may relatively-rotate the camera 121 with respect to the body 100. The preset condition may be based on a movement degree of the body 100. That is, the controller 180 may determine whether to relatively-rotate the camera 121 with respect to the body 100, or to maintain a perpendicular state between a front surface of the body and a reference line corresponding to a direction that the front surface of the camera faces, based on a movement degree of the body 100. Further, the controller 180 may control a relative-rotation degree of the camera 121 based on a movement degree of the body 100. This will be explained in more detail with reference to FIG. 5.

Then, if the camera 121 is relatively-rotated with respect to the body 100 to a moving direction (rotation direction) of the body 100, the controller 180 may output an image input through the relatively-rotated camera 121, to the display unit 151 (S330). More specifically, the controller 180 may real-time output an image input through the activated camera 121, to the display unit 151. Once the camera 121 is relatively-rotated, the controller 180 may output an image input by the relatively-rotated camera, to the display unit 151.

If an image is input through the camera 121 which has been relatively-rotated, the controller 180 may transform the image displayed on the display unit 151 or may output a graphic object so that the input image can be recognized as an image input through the relatively-rotated camera. Such a configuration will be explained in more detail with reference to FIG. 8.

As aforementioned, in the mobile terminal according to the present invention, once a motion of the body is sensed, the camera may be relatively-rotated with respect to the body in a moving direction of the body. Thus, a user can pre-check an image positioned at the moving direction through an image input through the relatively-rotated camera. Further, the user can capture a preferred scene without moving the mobile terminal to a place where the preferred scene can be seen.

Figure 5:
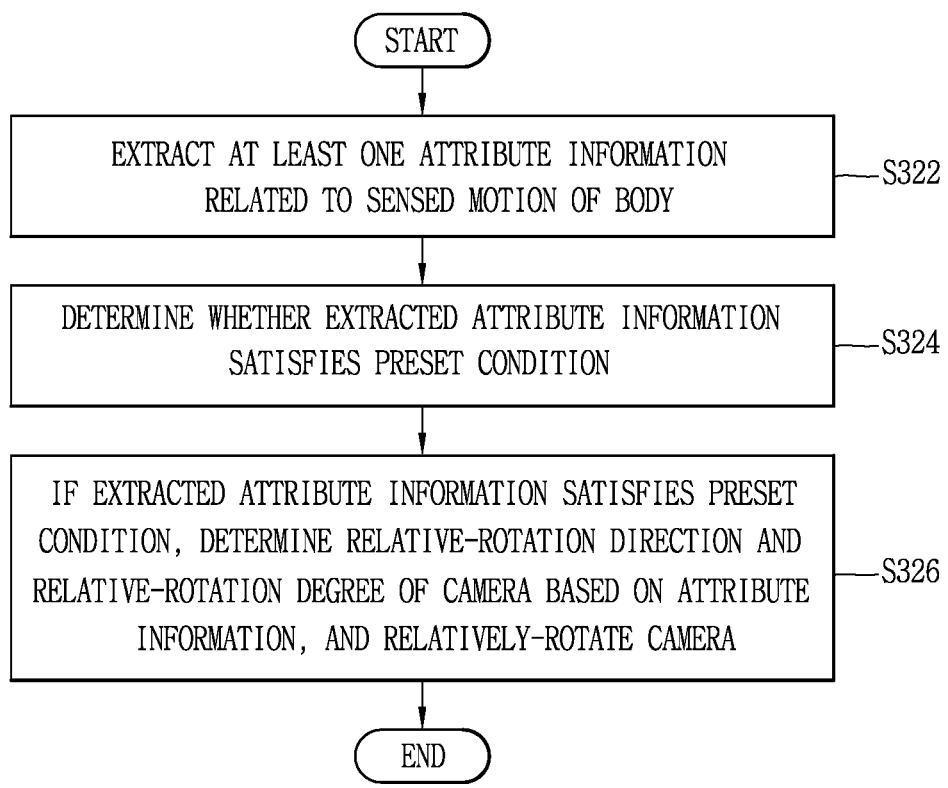
FIG. 5 is a flowchart illustrating FIG. 4 in more detail.
Figure 6:
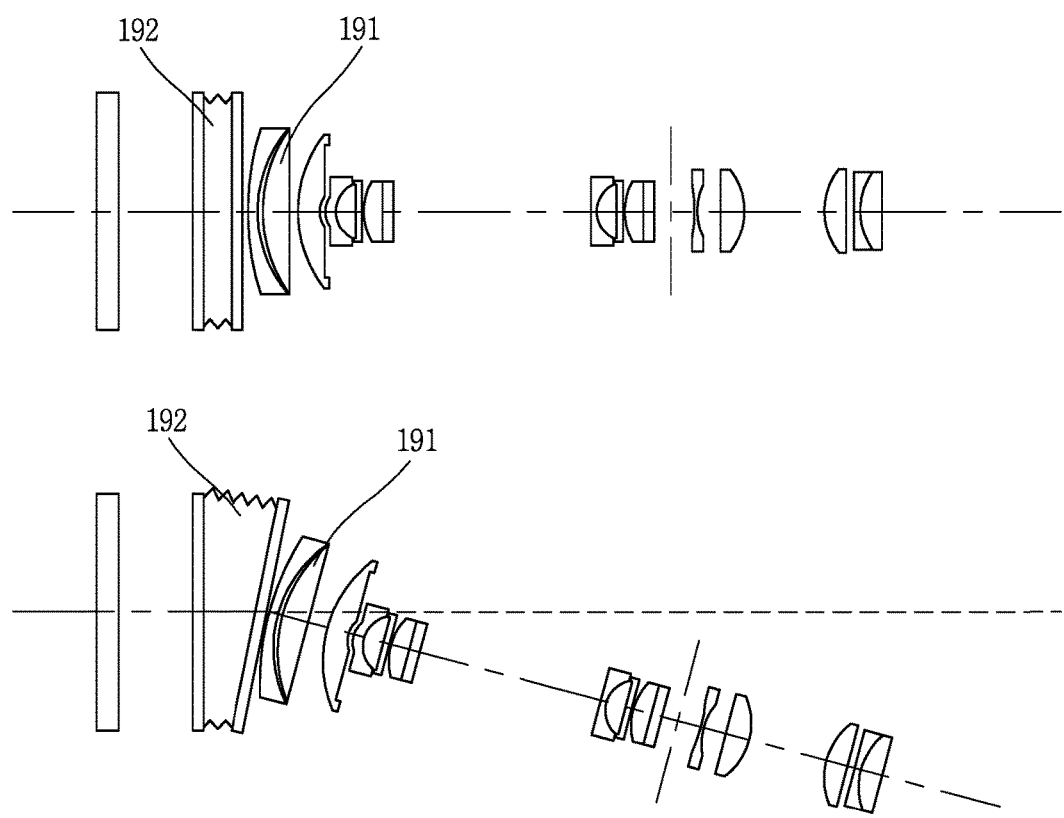
FIG. 6 is a conceptual view illustrating relative-rotation of a camera of a mobile terminal according to an embodiment of the present invention.

Hereinafter, a method of controlling relative-rotation of the camera by the controller will be explained in more detail with reference to the attached drawings. FIG. 5 is a flowchart illustrating FIG. 4 in more detail. FIG. 6 is a conceptual view illustrating relative-rotation of a camera of a mobile terminal according to an embodiment of the present invention.

Once a motion of the body 100 is sensed, the controller 180 may extract attribute information related to the motion. More specifically, if the body 100 is moved by an external force, the controller 180 may extract at least one attribute information related to the motion of the body 100. For instance, the attribute information may include a moving direction of the body, a moving speed of the body, a moving acceleration of the body, a rotation direction of the body, a rotation speed of the body, a rotation acceleration of the body, etc.

Then, the controller 180 may determine whether the extracted attribute information satisfies a preset condition. The preset condition may include whether the body 100 is moved or not, whether a moving speed or a rotation speed of the body 100 exceeds a preset speed or not, whether an acceleration or a rotation acceleration of the body 100 exceeds a preset acceleration or not, etc.

If the extracted information does not satisfy the preset condition, the controller 180 may restrict relative-rotation of the camera 121.

On the other hand, if the extracted information satisfies the preset condition, the controller 180 may determine a relative-rotation direction and a relative-rotation degree of the camera 121 based on attribute information. The relative-rotation direction may be determined based on at least one of a moving direction and a rotation direction of the body 100. The relative-rotation degree may be determined based on at least one of a moving speed, a rotation speed, an acceleration and a rotation acceleration among the attribute information. The controller 180 may determine a relative-rotation degree of the camera 121 in proportion to at least one of the moving speed, the rotation speed, the acceleration and the rotation acceleration. For instance, if a moving speed of the camera 100 is '2', a relative-rotation angle of the camera 121 may be '20°'. If a moving speed of the camera 100 is '3', a relative-rotation angle of the camera 121 may be '30°'. However, the present invention is not limited to this. That is, when at least one of a moving speed, a rotation speed, an acceleration and a rotation acceleration is increased or decreased, a relative-rotation degree of the camera may be also increased or decreased in proportion thereto. The relative-rotation degree of the camera may be modified variously according to a user's setting.

Once the relative-rotation direction and the relative-rotation degree are determined, the camera 121 may be relatively-rotated with respect to the body 100 based on the determined relative-rotation direction and relative-rotation degree, under control of the controller 180. Once the camera 121 is relatively-rotated with respect to the body 100 based on a motion of the body 100, an image input through the relatively-rotated camera 121 is output to the display unit 151. In this state, i.e., while the body 100 is being moved or rotated, if an image capturing operation is performed according to a user's request, captured images may be stored in the memory 170.

Hereinafter, a method of relatively-rotating the camera with respect to the body by hardware will be explained in more detail with reference to FIG. 6.

FIG. 6 illustrates an inner structure of the camera 121 in more detail. The camera 121 may include a lens 191 and a transformation member 192. The transformation member 192 may control an angle of the lens 191 with respect to the body. More specifically, the transformation member 192 may be an elastic member including a spring, a rubber band, etc., may be a transformable member using a pneumatic pressure, or may be a prism which enables angle conversion. Once a motion of the body 100 is sensed, the controller 180 may change an angle of the lens 191 by transforming the transformation member 192. More specifically, if a motion of the body 100 is sensed, the controller 180 may transform the transformation member 192 so that part of the transformation member 192 positioned at an opposite side to a moving direction of the body 100 can be elongated. As a result, the lens 191 connected to the transformation member 192 may be transformed so that the moving direction of the body 100 can be seen.

As another example, although not shown, the lens 191 itself may be transformed without being dependent on transformation of the transformation member 192.

As still another example, although not shown, the camera 121 may be relatively-rotated with respect to the body, by an external member (not shown) having the camera 121 including at least one of the lens 191 and the transformation member 192. The external member (not shown) is configured to change a direction or an angle of the camera 121. In the present invention, a limitation of angle change of the camera 121 by the transformation member 192 can be overcome by the external member.

As aforementioned, in the present invention, a user can relatively-rotate the camera with respect to the body, by changing a relative-rotation direction and a relative-rotation degree based on a motion of the body. Thus, the user can change an image output to the display unit by controlling his or her movement degree, thereby easily obtaining an image of a desired place. In this case, the image is about a place corresponding to a predicted moving path of the body, Hereinafter, a method of controlling relative-rotation of the camera with respect to the body based on a motion of the body will be explained in more detail with reference to the attached drawings.

Figure 7A:
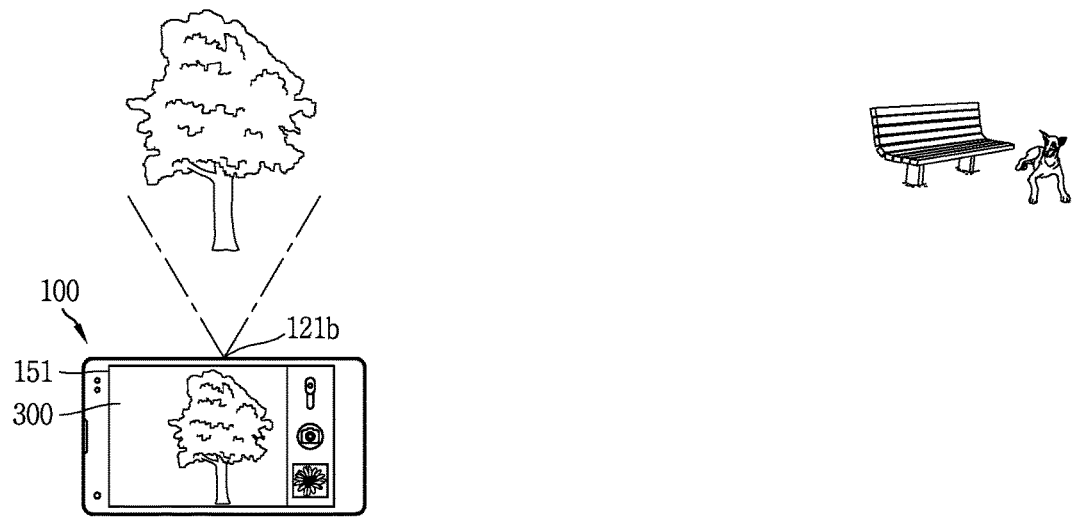
FIGS. 7A and 7B are conceptual views illustrating a method of controlling a mobile terminal according to an embodiment of the present invention.
Figure 7A:
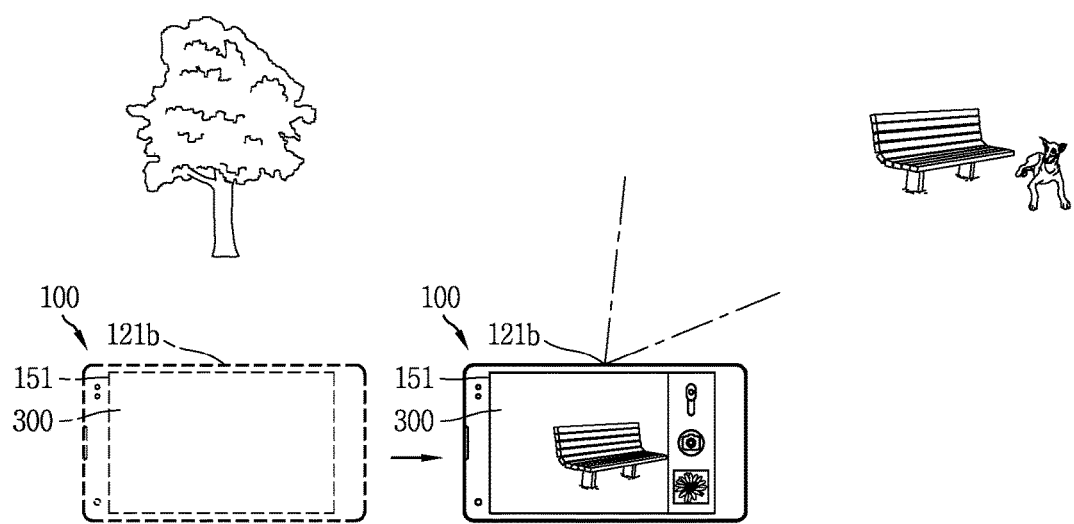
Figure 7A:
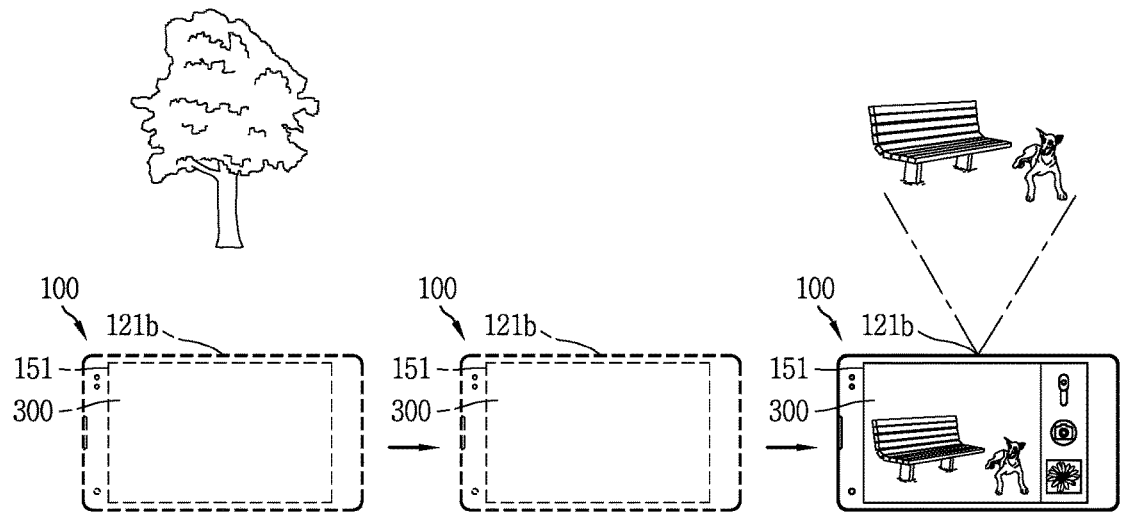
Figure 7B:
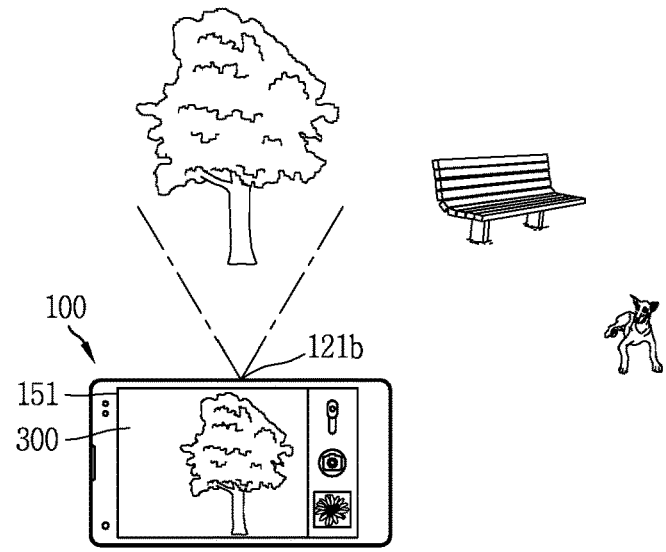
Figure 7B:
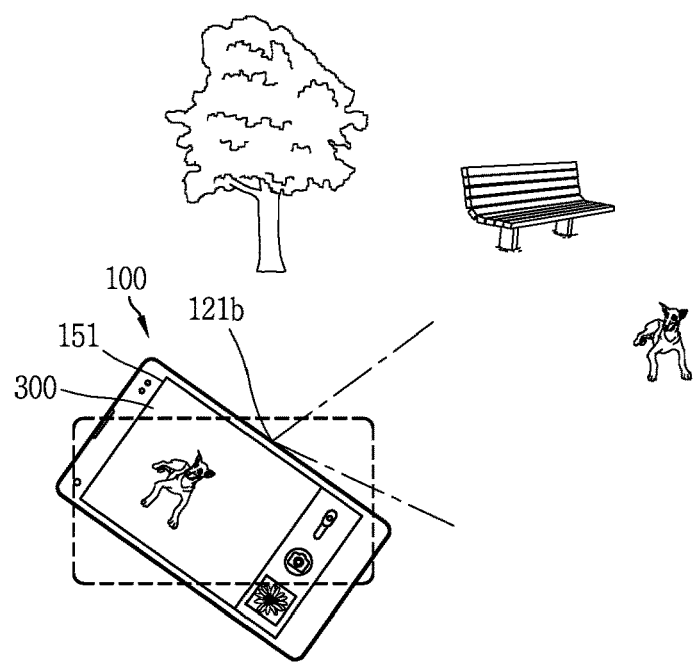
Figure 7B:
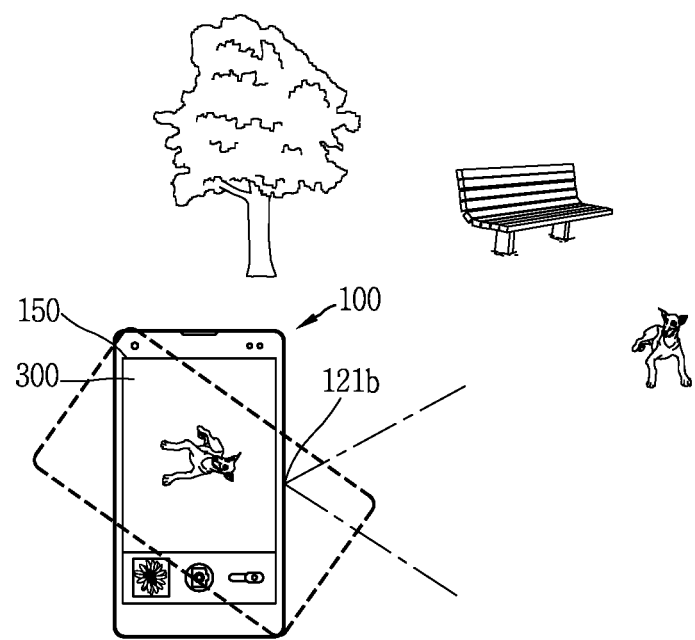

FIGS. 7A and 7B are conceptual views illustrating a method of controlling a mobile terminal according to an embodiment of the present invention.

If an image capturing function is performed in the mobile terminal according to the present invention, an image, input through the camera 121 which has not been relatively-rotated yet, may be output as shown in FIG. 7A(a). The camera 121, which has not been relatively-rotated yet, may be in a state where an angle between a front surface of the body 100 and a reference line corresponding to a direction that a front surface of the camera 121 faces is a right angle (90°). If the body 100 is moved, the controller 180 may relatively-rotate the camera 121 with respect to the body 100 in a moving direction of the body 100, as shown in FIG. 7A(b). The controller 180 may output an image input through the relatively-rotated camera 121, to the display unit 151. That is, the controller 180 may output an image of a place corresponding to a predicted moving path of the body based on the motion of the body, to the display unit 151. Then, as shown in FIG. 7A(c), if the moving body 100 is stopped, the controller 180 may relatively-rotate the camera 121 with respect to the body 100 in an opposite direction to the moving direction of the body 100. That is, if the motion of the body 100 is stopped, the controller 180 may restore the camera 121 which has been relatively-rotated with respect to the body 100 in the moving direction of the body 100, into a state before the relative-rotation.

As another embodiment, if it is sensed that the body which is moving is about to be stopped, the controller 180 may relatively-rotate the camera 121 with respect to the body in an opposite direction to the moving direction. More specifically, if an acceleration, one of attribute information related to a motion is negative, it means that a moving speed of the body is gradually decreased. Thus, the controller 180 may determine that the body 100 which is moving is about to be stopped. In this instance, the controller 180 may restore the camera 121 which has been relatively-rotated based on the motion of the body, into a state before the relative-rotation. That is, the controller 180 may relatively-rotate the camera 121 again with respect to the body 100, in an opposite direction to the moving direction of the body 100.

As another embodiment, once an image capturing function is performed in the mobile terminal according to the present invention, an image, input through the camera 121 which has not been relatively-rotated yet, may be output to the display unit 151 as shown in FIG. 7B(a). Then, if a rotation of the body 100 is sensed as shown in FIG. 7B(b), the controller 180 may relatively-rotate the camera 121 with respect to the body 100, in a rotation direction of the body 100. In this instance, an image, input through the relatively-rotated camera 121, may be output to the display unit 121. Then, if the rotating body 100 is stopped, the controller 180 may relatively-rotate the camera 121 with respect to the body 100, in an opposite direction to the rotation direction of the body 100. That is, if the rotation of the body 100 is stopped, the controller 180 may restore the camera 121 which has been relatively-rotated based on the rotation of the body 100, to a state before the relative-rotation. As another embodiment, if it is sensed that the rotating body 100 is about to be stopped, the controller 180 may relatively-rotate the camera 121 with respect to the body, in an opposite direction to the moving direction. Detailed explanations about this embodiment are the same as the descriptions with reference to FIG. 7A, except that the acceleration of FIG. 7A is changed into a rotation acceleration and the speed of FIG. 7A is changed into a rotation speed.

In the present invention, a user's confusion can be prevented by making the user recognize an image output to the display unit as an image input through the relatively-rotated camera.

Hereinafter, a method of outputting an image input through a relatively-rotated camera to a display unit will be explained in more detail with reference to the attached drawings. FIGS. 8A to 8D are conceptual views illustrating a method of outputting a user interface to a display unit, when a camera of a mobile terminal according to an embodiment of the present invention is relatively rotated. The method of outputting an image input through a relatively-rotated camera to a display unit may have various modifications. Hereinafter, some of the various methods of outputting an image input through a relatively-rotated camera to a display unit will be explained with examples.

In the present invention, an image input through the relatively-rotated camera 121 may be output to the display unit 151. In this instance, the controller 180 may divide the display unit 151 into a plurality of regions, may transform an image output to the display unit 151, or may output a graphic object so that a user can recognize that an image output to the display unit 151 as an image input through the relatively-rotated camera 121.

Figure 8A:
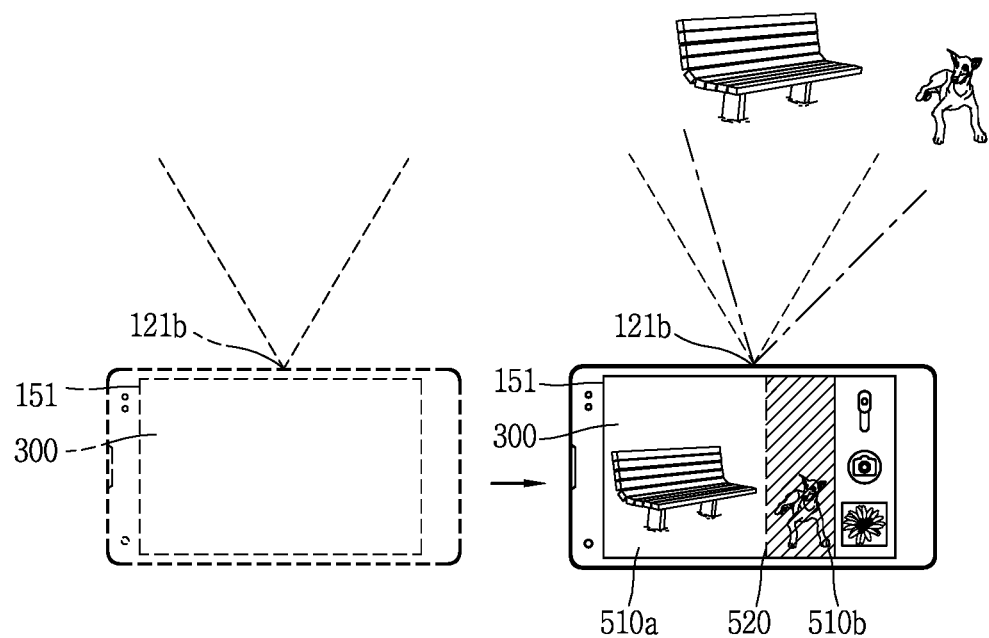
FIGS. 8A to 8D are conceptual views illustrating a method of outputting a user interface to a display unit, when a camera of a mobile terminal according to an embodiment of the present invention is relatively rotated.

For instance, as shown in FIG. 8A, the display unit 151 may include a first region 510a and a second region 510b. The controller 180 may divide the display unit 151 into the first region 510a and the second region 510b. The controller 180 may output a guide line 520 indicating that the display unit 151 has been divided into the first region 510a and the second region 510b.

A position of the first and second regions 510a, 510b on the display unit 151 may be determined based on a motion of the body 100. More specifically, the controller 180 may determine a position of the first and second regions 510a, 510b on the display unit 151 based on a moving direction of the body 100.

Part of an image input through the camera 121 which has not been relatively-rotated yet with respect to the body 100, may be output to the first region 510a. More specifically, referring to FIG. 8A, an overlapped part between an image input through the camera 121 which has not been relatively-rotated yet, and an image input through the camera 121 which has been relatively-rotated may be output to the first region 510a.

Part of an image input through the camera 121 which has been relatively-rotated with respect to the body 100, may be output to the second region 510b. More specifically, referring to FIG. 8A, an image input after relative-rotation of the camera, which is additionally input in comparison with an image input before relative-rotation of the camera, may be output to the second region 510b.

As shown in FIG. 8A, the controller 180 may highlight the second region 510b, may provide an image effect to the second region 510b, or may output a graphic object to the second region 510b, such that a user recognizes that an image input through the second region 510b is an image additionally input as the camera 121 is relatively-rotated. For instance, the second region 510b may be highlighted in a shaded manner.

The controller 180 may control a size of the first region 510a and the second region 510b. The controller 180 may control a size of at least one of the first and second regions, in proportion to a movement degree of the body 100. That is, a relative-rotation degree of the camera 121 with respect to the body 100 may be changed based on a motion of the body 100. The relative-rotation degree of the camera 121 with respect to the body 100 may be determined based on attribute information related to a motion of the body 100. The size of the first and second regions 510a, 510b may be changed based on a relative-rotation degree of the camera 121 with respect to the body 100. The controller 180 may control the size of the second region 510b, in proportion to a relative-rotation degree of the camera 121 with respect to the body 100. The size of the first region 510a may be changed by depending on change of the size of the second region 510b.

Figure 8B:
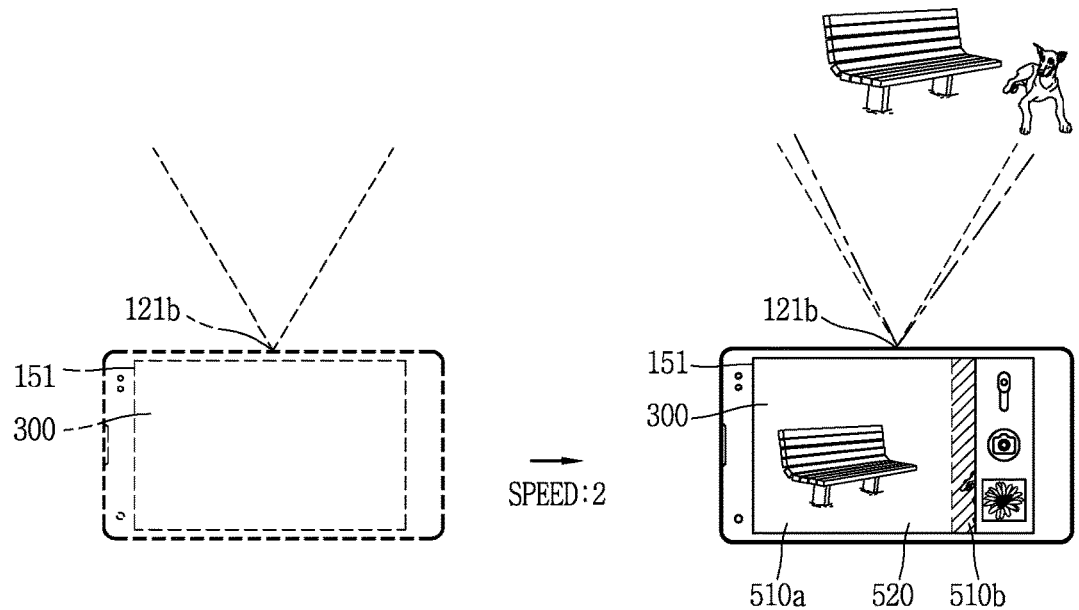
Figure 8B:
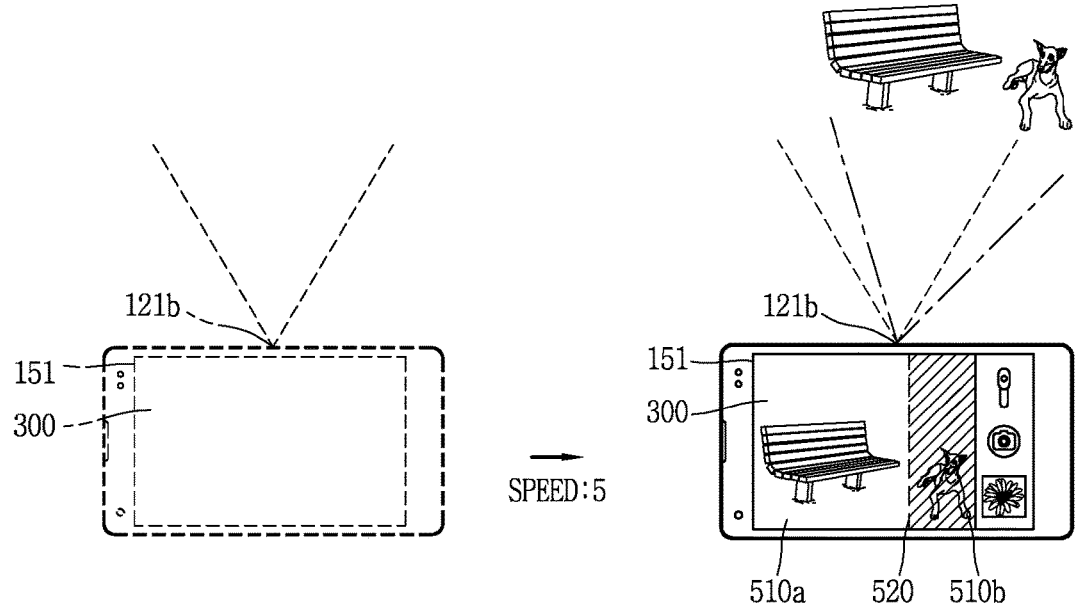

For instance, as shown in FIG. 8B(a), if a moving speed of the body 100 is '2', the camera 121 may be relatively-rotated with respect to the body 100 in proportion to the moving speed of the body 100. And the second region 510b may be displayed on the display unit 151 in proportion to a relative-rotation degree of the camera 121. Then, as shown in FIG. 8B(b), if a moving speed of the body 100 is '5', the camera 121 may be relatively-rotated with respect to the body 100, more than in the case of FIG. 8B(a), in proportion to the moving speed of the body 100. And the second region 510b may be displayed on the display unit 151 in proportion to a relative-rotation degree of the camera 121, with an area larger than that in FIG. 8B(a).

As another embodiment, an image input through the camera relatively-rotated with respect to the body based on a motion of the body may be transformed so that a user can recognize that the image has been input through the relatively-rotated camera. The controller 180 may control a frame to which an image is output. The frame may be disposed at part among an output region of the display unit 151. For instance, the frame may be disposed with a size corresponding to the output region of the display unit 151. Alternatively, the frame may be disposed on one region of the display unit 151, with a smaller size than the output region of the display unit 151. An image input through the camera 121 may be output to the frame. Once an image is input through the relatively-rotated camera, the controller 180 may transform the frame so that a user can recognize that the image has been input through the relatively-rotated camera. Then, the controller 180 may output the input image to the transformed frame.

Figure 8C:
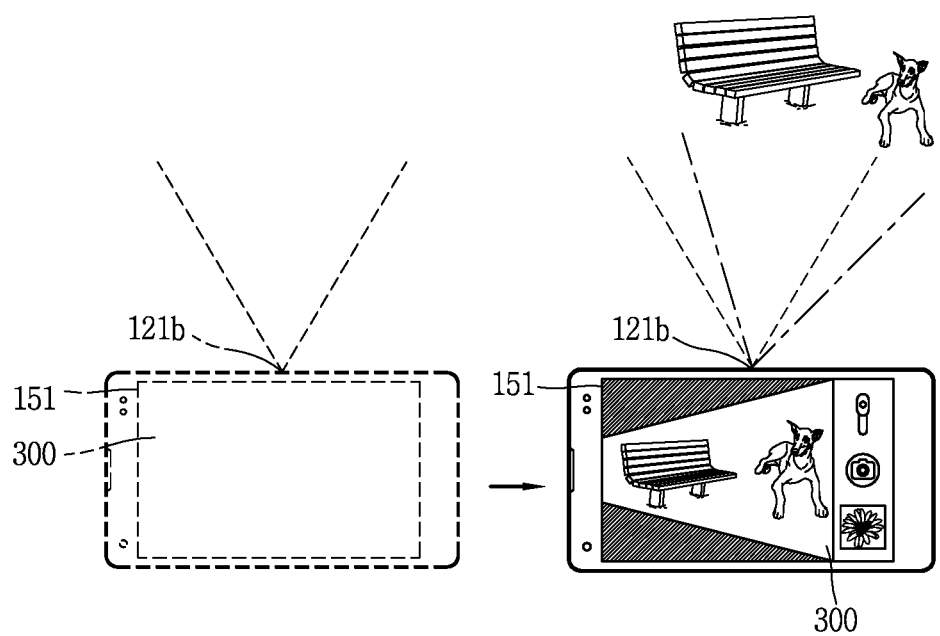

For instance, as shown in FIG. 8C, the controller 180 may output an image input through the camera relatively-rotated based on a motion of the body, to the display unit 151. And the controller 180 may change an output region of the image. As shown in FIG. 8C, the controller 180 may reduce a frame positioned in an opposite direction to a moving direction of the body 100, and may output an image input through the relatively-rotated camera to the transformed frame. For instance, the controller 180 may transform the frame into a trapezoid shape. However, the shape of the frame is not limited to a trapezoid shape. That is, the frame may be transformed into various shapes.

Figure 8D:
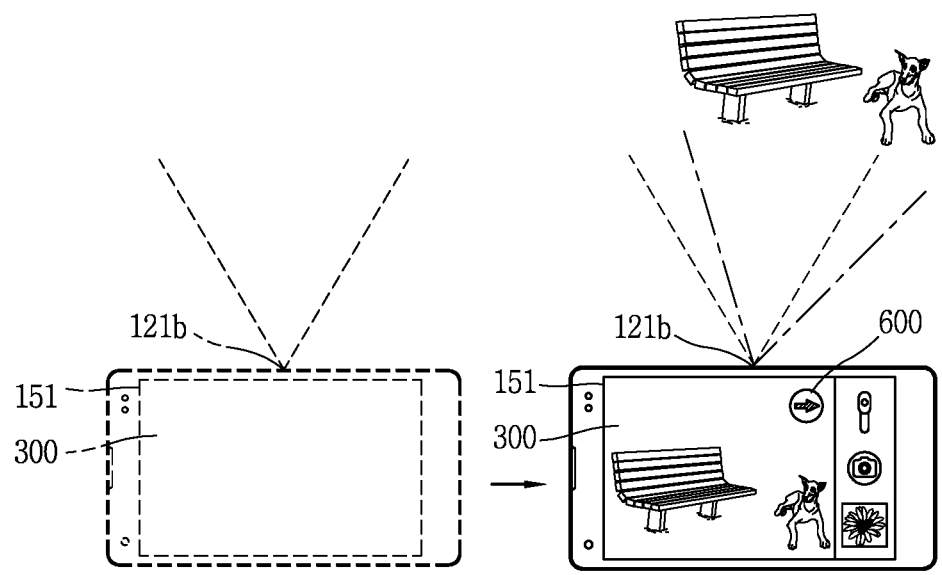

As another embodiment, as shown in FIG. 8D, the controller 180 may output a graphic object 600 indicating that an image output to the display unit 151 has been input through the camera relatively-rotated with respect to the body based on a motion of the body, in an overlapped manner with the image.

As aforementioned, in the present invention, for recognition of a relatively-rotated state of the camera, the display region 151 may be divided into a plurality of regions, a shape of an image output to the display unit 151 may be transformed, or a graphic object may be output to the display unit 151. With such a configuration, a user's confusion due to relative-rotation of the camera 121 when using an image capturing function can be reduced.

Hereinafter, an embodiment to apply the relatively-rotatable camera to an image capturing function will be explained in more detail with reference to the attached drawings.

Figure 9:
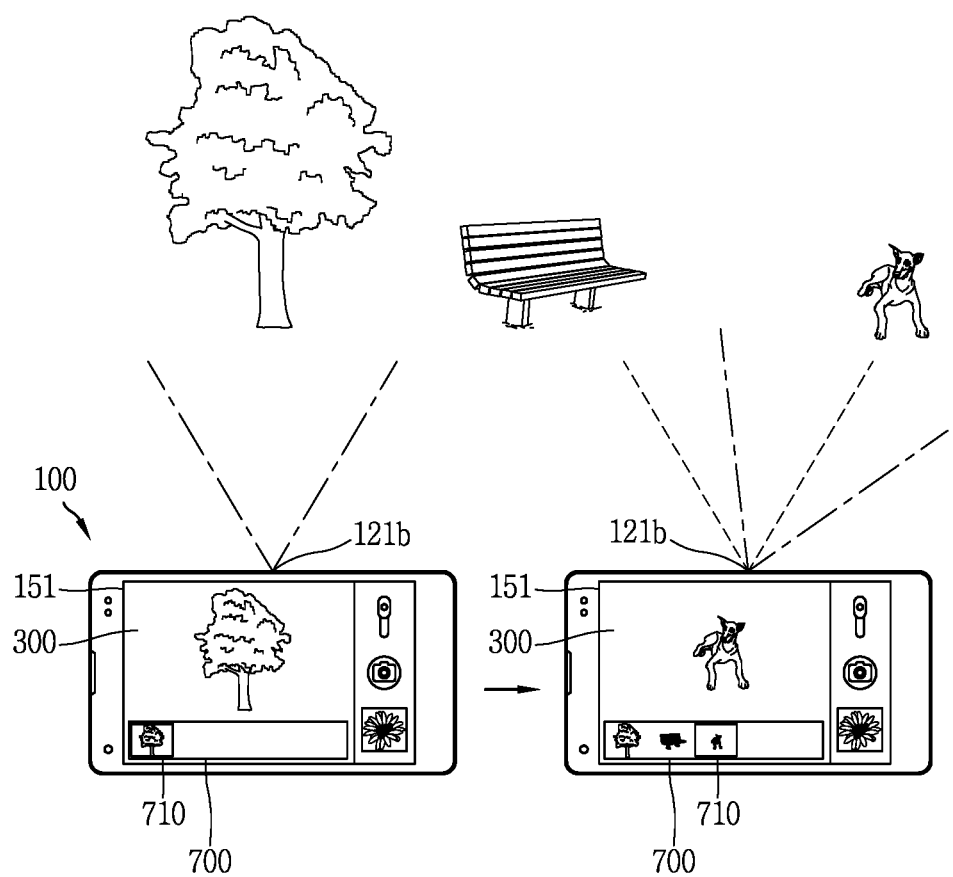
FIG. 9 is a conceptual view illustrating an example to apply relative-rotation of a camera of a mobile terminal according to an embodiment of the present invention, to a panorama function among image capturing functions.
Figure 10:
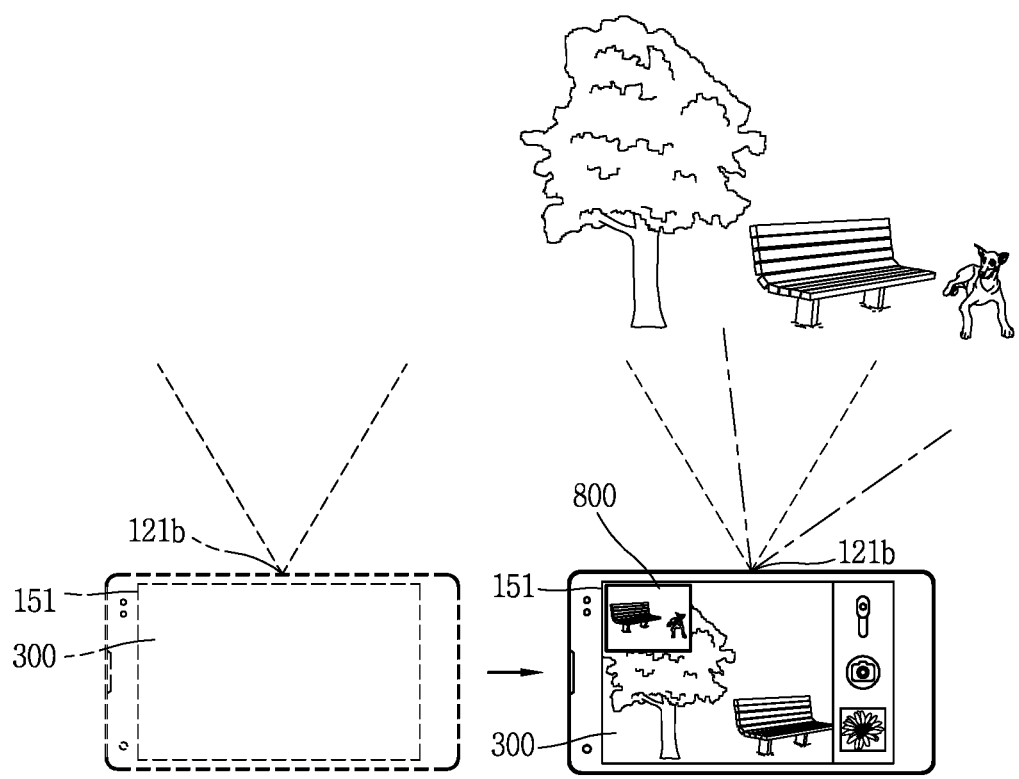
FIG. 10 is a conceptual view illustrating a method of outputting an image which has been input before relative-rotation of a camera, and an image which has been input after relative rotation of the camera, by a mobile terminal according to an embodiment of the present invention.

FIG. 9 is a conceptual view illustrating an example to apply relative-rotation of a camera of a mobile terminal according to an embodiment of the present invention, to a panorama function among image capturing functions.

The mobile terminal according to the present invention may provide various image capturing functions. One of the various image capturing functions may be a panorama function. The panorama function is to overcome limitations of the display unit and a view angle of the camera. More specifically, through the panorama function, the mobile terminal according to the present invention may continuously capture an image input in a moving state, the image different from an image input in a static state. As a result, an image, corresponding to a moving path of the camera and wider than the display unit and a view angle of the camera, can be captured. The panorama function will not be explained because it is a well-known one.

In the present invention, execution of the panorama function may be facilitated by relatively-rotating the camera with respect to the body. As shown in is FIG. 9, once the panorama function is executed, the display unit 151 may display a thumbnail 710 with respect to an image input through the camera 121, and a capturing range. And at least one of frames 700 indicating thumbnails with respect to captured images may be displayed. If a motion of the body is sensed, the controller 180 may relatively-rotate the camera 121 with respect to the body 100, to a moving direction of the body 100. Thus, the controller 180 may capture an image input through the relatively-rotated camera 121, through the panorama function. With such a configuration, the mobile terminal can capture an image of a place positioned farther away in a moving direction of the body, by a small motion of the body.

As aforementioned, in the present invention, a user can capture an image corresponding to a wider view angle even by a small motion of the body. This can enhance a user's convenience and maximize a panorama function.

Hereinafter, a method of outputting both an image input before relative-rotation of the camera and an image input after relative-rotation of the camera will be explained in more detail with reference to the attached drawings.

In the present invention, an image input before relative-rotation of the camera, and an image input after relative-rotation of the camera may be together output to the display unit 151. The image input before relative-rotation of the camera may be an image input in a state where an angle between a front surface of the body 100 and a reference line corresponding to a direction that a front surface of the camera 121 faces is 90°. The controller 180 may output a frame 800 for outputting an image input through the relatively-rotated camera, to one region of the display unit 151 in an overlapped manner. An image input through the relatively-rotated camera may be output to the frame 800. That is, an image input before relative-rotation of the camera may be output to the display unit 151, whereas an image input after relative-rotation of the camera may be output to the frame 800. An output position of the images may be changed.

The camera 121 may include a plurality of lenses arranged along at least one line. The plurality of lenses may be arranged in the form of matrices. The camera may be referred to as 'an array camera'. If the second camera 121b is configured as an array camera, an image may be captured in various manners by using a plurality of lenses. In this instance, an image of better quality may be obtained. If the camera of the present invention is an array camera, the controller 180 may not relatively-rotate one of the plurality of lenses, but may relatively-rotate another lens different from the one lens with respect to the body 100 in a moving direction of the body 100. With such a configuration, both an image input before relative-rotation of the camera, and an image input after relative-rotation of the camera may be output to the display unit 151.

In the present invention, an image input before relative-rotation of the camera, and an image input after relative-rotation of the camera may be simultaneously output to the display unit 151, by using a single lens. Such a configuration may be based on the number of frames per second which have been input through the camera. For instance, if it is assumed that the camera receives an image with 8 frames per second, the controller 180 may output an image input before relative-rotation of the camera to 4 frames, and may output an image input after relative-rotation of the camera to the rest 4 frames. It should be noted that the number of frames per second is not limited to 8.

The controller 180 may change a method to input an image through each frame. More specifically, the controller 180 may divide a plurality of frames input per second into two regions. Then, the controller 180 may output an image input before relative-rotation of the camera to the previous half region, and may output an image input after relative-rotation of the camera to the next half region. As another example, the controller 180 may output images to a plurality of frames input per second, in an alternating manner. For instance, the controller 180 may output an image input before relative-rotation of the camera to a first frame among 8 frames, and may output an image input after relative-rotation of the camera to a second frame among the 8 frames. Then, the controller 180 may output the image input before relative-rotation of the camera to a third frame among the 8 frames. The later processes are repeatedly performed, and thus detailed explanations will be omitted.

The controller 180 may control the camera 121 so that either an image input before relative-rotation of the camera, or an image input after relative-rotation of the camera can be output to each frame.

In a state where both an image input before relative-rotation of the camera and an image input after relative-rotation of the camera have been output to the display unit 151, the controller 180 may capture an image according to a user's request. For instance, if a user has selected a frame 800, the controller 180 may capture an image output to the frame 800. On the other hand, if a user has selected a preview image 300 rather than the frame 800, the controller 180 may capture an image output to the preview image 300. The controller 180 may capture the image output to the preview image 300 and the image output to the frame 800, in a state where the images have been output to the display unit 151.

As aforementioned, in the present invention, an image input before relative-rotation of the camera, and an image input after relative-rotation of the camera may be together output. Thus, a user can easily capture his or her preferred image when using an image capturing function.

Hereinafter, various embodiments to apply relative-rotation of the camera will be explained.

The mobile terminal according to the present invention may further include a rotation member. The rotation member may be a vehicle handle, etc. according to an embodiment of the present invention. That is, the mobile terminal according to the present invention may serve as a black box, a navigation apparatus, etc., by being mounted to a vehicle. In this instance, the controller 180 may relatively-rotate the camera 121 with respect to the body 100, based on rotation information input through the rotation member.

As another example, the mobile terminal according to the present invention may perform an object tracking function. That is, the controller 180 may perform an object tracking function for capturing a moving object while the specific object is moving with respect to an image input through the camera 121. In this instance, the controller 180 may relatively-rotate the camera 121 with respect to the body 100 so that the moving object can be tracked.

As still another example, the mobile terminal according to the present invention may perform a handover function. The handover function indicates a function to continuously capture a moving object by another camera adjacent to one camera when the moving object is out of view angle range of the one camera among a plurality of cameras. That is, each of a plurality of mobile terminals may perform an object tracking function with respect to a moving object. The controller 180 may relatively-rotate the camera 121 with respect to the body 100 so as to track a moving object. Then, if it is impossible to relatively-rotate the camera 121 with respect to the body 100 due to a hardware limitation, the controller 180 may transmit a control command to a neighboring mobile terminal so that the neighboring mobile terminal can capture the moving object.

As aforementioned, relative-rotation of the camera according to the present invention may be applicable to various fields.

The aforementioned configuration of the present invention may be applicable to the glass-type mobile terminal 400 aforementioned with reference to FIG. 2. That is, the camera 421, the display unit 451 and the control module 480 of the glass-type mobile terminal 400 may include technical features of the camera 121, the display unit 151 and the controller 180 of the mobile terminal 100. The present invention may be also applicable to not only the glass-type mobile terminal, but also a wearable mobile terminal (watch-type mobile terminal) if the wearable mobile terminal includes a camera, a display unit and a controller.

The aforementioned functions of the present invention may be mounted to the mobile terminal as basic functions, before the mobile terminal is presented to the market. Alternatively, the aforementioned functions of the present invention may be provided in the form of applications downloadable through an external server by using wireless communication. Thus, if downloaded applications are installed on the mobile terminal, the functions of the present invention may be provided at the mobile terminal.

Various embodiments may be implemented using a machine-readable medium having instructions stored thereon for execution by a processor to perform various methods presented herein. Examples of possible machine-readable mediums include ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a body;
a sensor configured to sense a motion of the body;
a camera formed to be relatively-rotatable with respect to the body, based on the sensed motion;
a display unit configured to output an image input through the camera; and
a controller configured to relatively-rotate the camera with respect to the body in a moving direction of the body when a motion of the body is sensed, such that an image of a place corresponding to a predicted moving path of the body based on the motion of the body is output,
wherein an image input through the relatively-rotated camera is output to the display unit,
wherein the display unit includes a first region and a second region,
wherein the controller determines a position of the first and second regions on the display unit, based on the moving direction of the body,
wherein part of an image input through the camera which has not been relatively-rotated yet with respect to the body is output to the first region, and
wherein part of an image input through the camera which has been relatively-rotated with respect to the body is output to the second region.

2. The mobile terminal of claim 1, wherein the camera is operated in either a first state before relative-rotation with respect to the body, or a second state after relative-rotation with respect to the body, and
wherein the controller converts the camera to the second state from the first state when the motion of the body is sensed.

3. The mobile terminal of claim 2, wherein when the motion of the body is stopped, the controller relatively-rotates the camera with respect to the body in an opposite direction to the moving direction of the body.

4. The mobile terminal of claim 1, wherein the controller extracts at least one attribute information related to the sensed motion of the body, and
wherein when the extracted attribute information satisfies a preset condition, the controller relatively-rotates the camera with respect to the body.

5. The mobile terminal of claim 4, wherein the extracted attribute information includes a direction, a speed and an acceleration, and
wherein the controller determines a relative-rotation degree of the camera with respect to the body, based on at least one of the speed and the acceleration.

6. The mobile terminal of claim 1, wherein the controller controls a size of the second region in proportion to a relative-rotation degree of the camera with respect to the body, and
wherein a size of the first region is changed by depending on change of the size of the second region.

7. A method of controlling a mobile terminal, comprising:
outputting an image input through a camera, to a display unit, wherein the display unit includes a first region and a second region;
sensing a motion of a body;
when the motion of the body is sensed, relatively-rotating the camera with respect to the body in a moving direction of the body, such that an image of a place corresponding to a predicted moving path of the body based on the motion of the body is output;
outputting an image input through the relatively-rotated camera, to the display unit; and
determining a position of the first and second regions on the display unit, based on the moving direction of the body,
wherein part of an image input through the camera which has not been relatively-rotated yet with respect to the body is output to the first region, and part of an image input through the camera which has been relatively-rotated with respect to the body is output to the second region.

8. The method of claim 7, wherein the camera is operated in either a first state before relative-rotation with respect to the body, or a second state after relative-rotation with respect to the body, and
wherein in the step of outputting, if the motion of the body is sensed, the camera is converted to the second state from the first state, and a second image input in the second state is output to the display unit.

9. The method of claim 8, wherein in the step of relatively-rotating, if the moving body is stopped, the camera is relatively-rotated with respect to the body in an opposite direction to the moving direction of the body.

10. The method of claim 7, wherein in the step of relatively-rotating, at least one attribute information related to the sensed motion of the body is extracted, and
wherein if the extracted attribute information satisfies a preset condition, the camera is relatively-rotated with respect to the body.

* * * * *